US011908308B2

(12) United States Patent
Constantine et al.

(10) Patent No.: US 11,908,308 B2
(45) Date of Patent: Feb. 20, 2024

(54) REDUCTION OF FALSE DETECTIONS IN A PROPERTY MONITORING SYSTEM USING ULTRASOUND EMITTER

(71) Applicant: Alarm.com Incorporated, Tysons, VA (US)

(72) Inventors: Dean Constantine, Ft. Lauderdale, FL (US); Gary Franklin Bart, Weston, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/843,363

(22) Filed: Jun. 17, 2022

(65) Prior Publication Data

US 2023/0024267 A1 Jan. 26, 2023

Related U.S. Application Data

(60) Provisional application No. 63/221,556, filed on Jul. 14, 2021.

(51) Int. Cl.
*G08B 29/18* (2006.01)
*G08B 13/16* (2006.01)

(52) U.S. Cl.
CPC ....... *G08B 29/185* (2013.01); *G08B 13/1618* (2013.01)

(58) Field of Classification Search
None
See application file for complete search history.

(56) References Cited

U.S. PATENT DOCUMENTS

| | | | | | |
|---|---|---|---|---|---|
| 10,467,891 | B1 | 11/2019 | Bart et al. | | |
| 2005/0128072 | A1* | 6/2005 | Li | G08B 13/19658 340/539.18 | |
| 2008/0246623 | A1* | 10/2008 | Nagashima | G08B 17/107 340/630 | |
| 2019/0066475 | A1* | 2/2019 | Bordelon | A01M 29/24 | |
| 2020/0085407 | A1 | 3/2020 | Grundfest et al. | | |
| 2020/0341457 | A1* | 10/2020 | Prugh | G05B 19/4155 | |

FOREIGN PATENT DOCUMENTS

| | | | | |
|---|---|---|---|---|
| CN | 105575026 A | * | 5/2016 | |
| CN | 111257429 | | 6/2020 | |
| GB | 2528703 A | * | 2/2016 | G08B 13/1618 |

OTHER PUBLICATIONS

PCT International Search Report and Written Opinion in International Appln. No. PCT/US22/73708, dated Oct. 6, 2022, 9 pages.

* cited by examiner

*Primary Examiner* — Muhammad Adnan
(74) *Attorney, Agent, or Firm* — Fish & Richardson P.C.

(57) ABSTRACT

Methods, systems, and apparatus, including computer programs encoded on computer storage media, for reduction of false detections using an ultrasound emitter. One of the methods includes obtaining sensor data captured by a sensor of a property monitoring system; detecting an object represented by the sensor data; determining that the object represented by the sensor data is likely a non-object of interest and being detected as an object of interest; and in response to determining that the object represented by the sensor data is likely the non-object of interest and being detected as the object of interest, sending, to an ultrasound emitter, a command to cause the ultrasound emitter to emit ultrasonic sound around the sensor.

20 Claims, 4 Drawing Sheets

REDUCTION OF FALSE DETECTIONS IN A PROPERTY MONITORING SYSTEM USING ULTRASOUND EMITTER

CROSS-REFERENCE TO RELATED APPLICATION

This application claims the benefit of U.S. Provisional Application No. 63/221,556 filed Jul. 14, 2021, the contents of which are incorporated by reference herein.

TECHNICAL FIELD

This disclosure application relates generally to property monitoring systems.

BACKGROUND

A property monitoring system uses one or more cameras to continuously capture images or videos of a scene near a property, such as a house or a building. The property monitoring system performs analysis of the images or the videos of the scene and uses various computer vision methods to determine whether there is an object of interest or movement of an object of interest in the captured image/video. For example, the property monitoring system can detect pets, particular types of animals, people, and vehicles that exist or move in a captured video. When an object of interest is detected or a movement is detected, the property monitoring system can notify the owner of the property, e.g., sending a message to the owner of the property regarding suspicious movements of a person near a house. The property monitoring system can store one or more images or video clips that capture the object of interest or the movement of the object in a data storage system such that the owner of the property can review the images or the video clips at a later time.

SUMMARY

The disclosed systems, methods, and techniques relate to reduction of false detections in a property monitoring system using an ultrasound emitter.

One of the reasons for false detections in a property monitoring system is interferences from arthropods, such as spiders, moths, and other insects, that are attracted to a camera's light source, e.g., an infrared (IR) light or an LED light used for night time illumination. For example, insects such as moths can fly close to the camera, and spiders can build webs in front of the camera. The movement of the arthropods, the movement of their web, or both can be falsely detected as the motion of an object of interest by the property monitoring system.

The disclosed property monitoring system uses an ultrasound emitter to emit high-frequency ultrasound waves to deter and repel arthropods. Instead of constantly emitting the ultrasound waves, the system can improve the effectiveness of the ultrasound emitter by turning on the ultrasound emitter in response to trigger events that are based on one or more of video analytics and user settings. For example, the system can be configured to automatically detect possible false positive detections and can be configured to control the emitter to emit short bursts of high-frequency waves only in response to the possible false positive detections. In some implementations, the system can trigger the ultrasound emitter to emit ultrasound waves for a first period of time, and after turning off the emitter and determining that false positive detections are reoccurring, the system can trigger the ultrasound emitter to emit the ultrasound waves for a second period of time that is longer than the first period of time for improved deterrence of the arthropods.

In general, one innovative aspect of the subject matter described in this specification can be embodied in methods that include the actions of obtaining sensor data captured by a sensor of a property monitoring system; detecting an object represented by the sensor data; determining that the object represented by the sensor data is likely a non-object of interest and being detected as an object of interest; and in response to determining that the object represented by the sensor data is likely the non-object of interest and being detected as the object of interest, sending, to an ultrasound emitter, a command to cause the ultrasound emitter to emit ultrasonic sound around the sensor.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The actions include determining, using first sensor data captured by the sensor while the ultrasound emitter is emitting the ultrasonic sound during a first period of time, that the object is not being detected as the object of interest in the first sensor data; in response to determining, using the first sensor data captured by the sensor while the ultrasound emitter is emitting the ultrasonic sound during the first period of time, that the object is not being detected as the object of interest in the first sensor data, sending, to the ultrasound emitter, a command to cause the ultrasound emitter to stop emitting the ultrasonic sound around the sensor; determining, using second sensor data captured by the sensor after the ultrasound emitter stops emitting the ultrasonic sound, that the object is likely being detected as the object of interest in the second sensor data; and in response to determining, using the second sensor data captured by the sensor after the ultrasound emitter stops emitting the ultrasonic sound, that the object is likely being detected as the object of interest in the second sensor data, sending, to the ultrasound emitter, a command to cause the ultrasound emitter to emit the ultrasonic sound around the sensor for a second period of time, wherein the second period of time is longer than the first period of time. The non-object of interest includes an arthropod, a web of the arthropod, or both. The actions include detecting, within a period of time, at least a plurality of objects including the object; determining that a frequency of the plurality of objects satisfies a predetermined threshold; and in response to determining that the frequency of the plurality of objects satisfies the predetermined threshold, determining, for each of the plurality of objects, whether the corresponding object is likely a non-object of interest and being detected as an object of interest, including determining whether the object represented by the sensor data is likely a non-object of interest and being detected as an object of interest. Determining that the object represented by the sensor data is likely the non-object of interest and being detected as the object of interest includes: receiving a signal from a user device indicating that the object caused a false detection. The actions include determining that the object was not detected in second sensor data captured by the sensor while the ultrasound emitter was emitting the ultrasonic sound; and in response to determining that the object was not detected in the second sensor data captured by the sensor while the ultrasound emitter was emitting the ultrasonic sound, determining that the object caused a false detection. The actions include determining to skip performing an action using the sensor data which action would be performed if the object represented by the sensor data was likely an object of interest. The actions include classifying information generated from the sensor data corresponding to the object with a non-object label. The actions include determining to skip sending a notification of the false detection to a user device. The actions include determining that a light source near the sensor is off; and in response to determining that the light source near the sensor is off, determining to deactivate the ultrasound emitter. Determining that the object represented by the sensor data is likely the non-object of interest and being detected as the object of interest includes: determining, using a first sensor analysis process, that the object is a potential object of interest; and after determining that the object is the potential object of interest, determining, using a second different sensor analysis process, that the potential object of interest is likely the non-object of interest.

The subject matter described in this specification can be implemented in various embodiments and may result in one or more of the following advantages. In some implementations, the use of an ultrasound emitter in response to determining that the object represented by the sensor data is likely the non-object of interest and being detected as the object of interest can reduce false positives, improve an accuracy of the property monitoring system in detecting objects of interest, or both. In some implementations, determining to deactivate the ultrasound emitter, causing an ultrasound emitter to stop emitting the ultrasonic sound around the sensor in response to determining that the object is not being detected as the object of interest in the first sensor data, or both, can reduce power consumption. In some implementations, determining to skip performing an action using the sensor data which action would be performed if the object represented by the sensor data was likely an object of interest, determining to skip sending a notification of the false detection to a user device, or both, can reduce resource usage, e.g., computational resources such as power, processor cycles, memory usage, or a combination of these.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
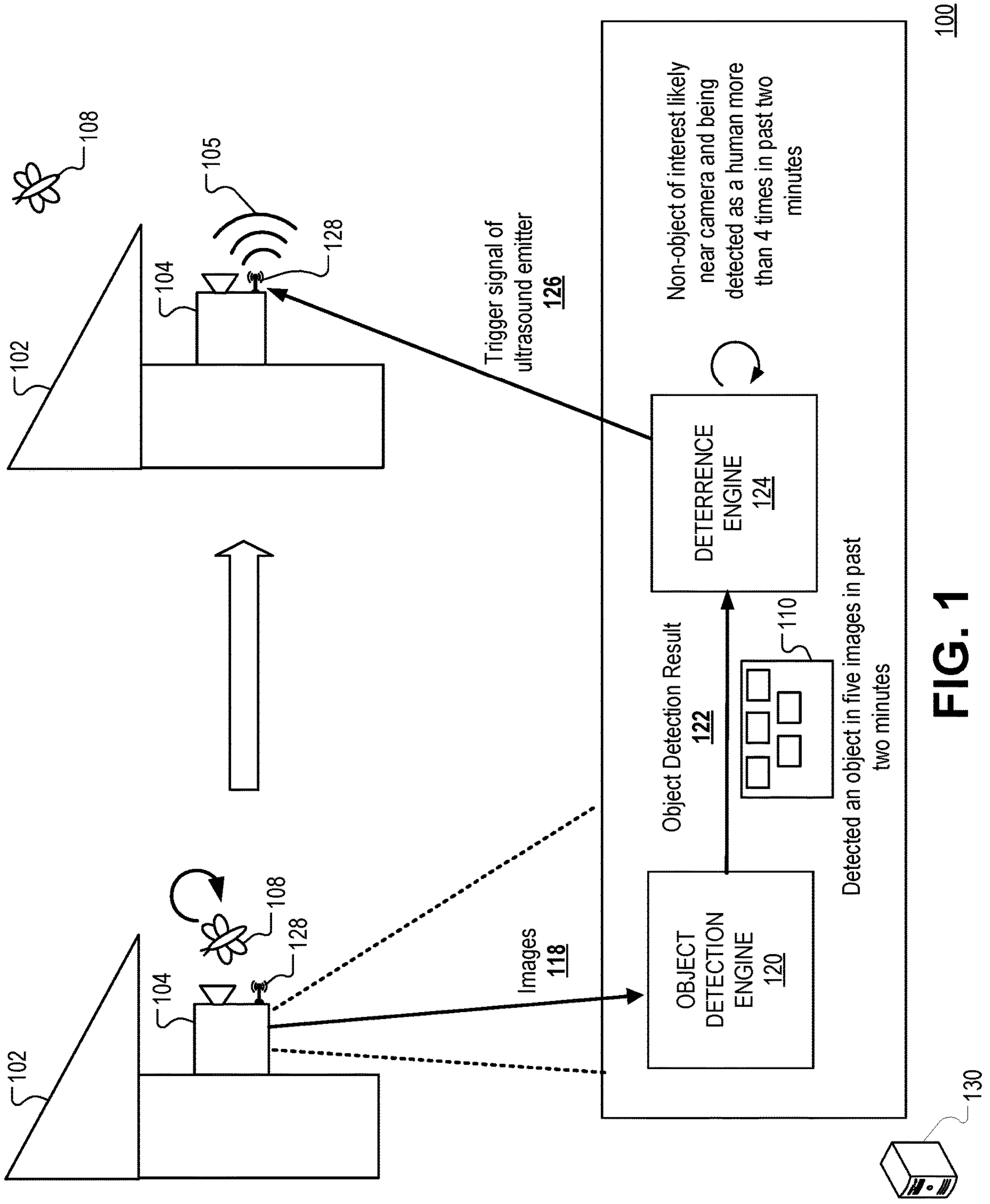
FIG. 1 is a diagram illustrating an example of a property monitoring system with an ultrasound emitter to reduce false detections.

FIG. 1 is a diagram illustrating an example of a property monitoring system 100 with an ultrasound emitter to reduce false detections. The system 100 includes one or more cameras 104 that monitor a property 102. The property 102 can be a residential property or a commercial property.

The camera 104 can be a video or a photographic camera or other type of optical sensing device configured to capture images and videos. The camera 104 can be configured to capture images of an area near the property 102. The camera 104 can monitor the area within a field-of-view (FOV) of the camera 104. The camera 104 can be configured to capture single, static images of the area or videos of the area, such as the captured images 118. In some implementations, the property monitoring system 100 uses the camera 104 to continuously capture images or videos of the scene near the property 102.

The property monitoring system 100 can determine whether there is an object of interest in the images 118 captured by the camera 104. Example objects of interest include pets, particular types of animals, people, vehicles, and so on. For example, the property monitoring system 100 can detect that a vehicle is parked near the property 102. In some examples, the property monitoring system 100 can detect that a stranger comes near the property 102.

In some implementations, the camera 104 can process the captured images/video using an object detection engine 120. The object detection engine 120 implements one or more computer vision methods to detect objects of interest. In some implementations, the object detection engine 120 can implement one or more computer vision methods to detect motion or movement near the property. For example, the object detection engine 120 can be configured to detect a motion of a specific type of object of interest, such a motion of a person, or to detect motion or movement near the property 102 in general.

The object detection engine 120 can be a built-in component as a part of the camera 104, or can be deployed in a computer system located at the property 102. In some implementations, the camera 104 can communicate with a remote computer system 130 that includes the object detection engine 120. The remote computer system 130 can be located at another location away from the property 102 and can be a server or other electronic device. The camera 104 can transmit the captured images 118 through a wired or wireless communication network to the remote computer system 130. The object detection engine 120 of the remote computer system 130 can compare and analyze the captured images 118 to detect objects of interest.

The object detection engine 120 can generate an object detection result 122. The object detection result can include an object detection score indicating a likelihood that an object or a motion of an object, or both, exists in the captured images 118. In some implementations, the object detection score can be a binary value, e.g., TRUE or FALSE, indicating whether an object has been detected. In some implementations, the object detection result 122 can include an image in which the object has been detected. In some implementations, the object detection result 122 can include a bounding box or other types of boundary label which can locate the object in the image.

The object detection result 122 can be a true detection, e.g., true positive detection, or a false detection, e.g., false positive detection or false alarm. A true detection happens when the object detection result indicates there is an object of interest while there is an object of interest in the area near the property. A false detection happens when the object detection result indicates there is an object of interest while in fact there is no object of interest in the area near the property.

One of the reasons for false detection is interferences from one or more arthropods 108 near the camera 104. Arthropods are attracted to a light source of the camera 104, e.g., an infrared (IR) light or an LED light used for night time illumination. For example, arthropods such as moths or other insects can fly close to the camera, and spiders can build webs in front of the camera. The presence of the arthropods in front of the camera, the webs built by the arthropods, or both, are illuminated by the light source of the camera 104. The arthropods, the webs, or both, can be identified by the object detection engine as detected objects of interest. For example, the captured images 118 of the bugs can be out of focus or the bug may have its wings extended in a particular orientation that triggers the computer vision algorithms employed by the object detection engine 120 to identify the bugs as objects of interest.

For example, the IR light of the camera 104 attracts a moth 108 that flies near the camera 104. The camera 104 can capture one or more images 118 and send them to the object detection engine 120. The object detection engine 120 can generate an object detection result 122 that indicates a human has been detected in a captured image 118. This detection result is a false detection because the moth 108 flying near the camera 104 is erroneously detected as a human and there is no human near the property 102 at the time the image 118 was captured.

In some implementations, the object detection result 122 can include multiple detection results aggregated over a period of time. For example, the object detection result 122 can be a false detection result 110 that indicates that an object is detected in five images in the past two minutes. This false detection result 110 is due to the moth 108 that has been hovering around the camera 104 in the past two minutes.

The repetitive false detections are undesirable. The system 100 can be configured to send to a user device a notification, e.g., an alert message, when an object of interest is detected, and the repetitive false detections can result in multiple notifications in a short amount of time, e.g., fifty notifications in a three minute period. The system 100 can be configured to save the image or the video clip corresponding to the object detection in a data storage system, and the repetitive false detections can occupy a large amount of storage space in the data storage system, e.g., saving 50 video clips of the flying bugs.

The system 100 includes an ultrasound emitter 128 that can generate ultrasound waves 105 to deter and repel the arthropods. The ultrasound emitter 128 can be integrated in the camera 104 as a built-in component as illustrated in FIG. 1. In some implementations, an ultrasound emitter 128 can be a separate device that is installed near the camera 104. The ultrasound emitter can emit high-frequency ultrasound waves 105, e.g., at one or more frequencies ranging from 50,000 Hz to 100,000 Hz. Because the camera 104 is connected to a power source and has continuous power supply, the camera can provide uninterrupted power to a built-in ultrasound emitter 128.

The system 100 includes a deterrence engine 124 that can be configured to send a command to cause the ultrasound emitter to emit ultrasonic sound. In some implementations, the command can include a trigger signal 126 of the ultrasound emitter 128. The trigger signal 126 is a control signal of the ultrasound emitter 128 that can turn on or turn off the ultrasound emitter 128. Similar to the object detection engine 120, the deterrence engine 124 can be located at the property 102, can be configured as a built-in component in the camera 104, or can be located at a remote computer system 130 located at another location.

The deterrence engine 124 receives an object detection result 122 generated from the object detection engine 120 and can determine whether the object detection result 122 is a false detection. The deterrence engine 124 can determine whether the detected object represented in the image 118 is likely a non-object of interest and being detected as an object of interest. Non-objects of interest include objects, such as insects and spiders, which do not belong to the objects of interest. For example, the deterrence engine 124 can determine whether arthropods, such as insects or spiders and their webs, are likely being detected as a human in the images 118 captured by the camera 104.

In some implementations, the deterrence engine 124 can determine whether the detected objects represented in the images 118 are likely non-objects of interest and detected as the objects of interest based on whether a frequency of the detected objects satisfies a predetermined threshold. The frequency of the detected objects can include a number of object detections within a period of time, a frequency value, or a gap between the object detections. For example, the deterrence engine 124 can determine whether the number of object detections within a period of time satisfies a criteria. In some implementations, the criteria may be that the number of detections within the period of time is larger than a predetermined threshold. It may be unlikely that an object of interest, such as a person, is detected more than a threshold amount of times within a short period of time. e.g., four times in two minutes. Therefore, if the deterrence engine 124 determines that the number of object detections within a period of time is larger than a threshold, the deterrence engine 124 can determine that the detected objects are likely non-objects of interest, such as a bug, that are likely near the camera 104.

For example, the deterrence engine 124 can receive the detection result 110 generated from the object detection engine 120. The deterrence engine 124 can determine that the detection result 110 likely includes non-objects of interest, such as a moth, that are likely near the camera 104 and being detected as a human for five times in the past two minutes. Thus, a frequency of the detected objects in the detection result 110 satisfies a predetermined threshold, e.g., more than four times in the past two minutes. The deterrence engine 124 may receive a single detection result 110 that indicates detections over a period of time, or receive individual detections as they occur and count the number of individual detections received over the period of time.

After determining that objects represented by the images 118 are likely non-objects of interest and being detected as objects of interest, the deterrence engine 124 can send a command to cause the ultrasound emitter to emit ultrasonic sound around the camera 104, e.g., sending a trigger signal 126 to the ultrasound emitter 128 to turn on the ultrasound emitter 128. The ultrasound emitter 128 can emit high-frequency ultrasound waves 105 to repel the moth 108. After the moth 108 goes far away from the camera 104, the property monitoring system 100 can no longer detect objects that are likely non-objects of interest, e.g., the moth 108, in multiple images captured within a short amount of time. The system 100 can determine that the previous detections are false detections caused by one or more arthropods that have been successfully repelled.

The system 100 can reduce false detections by not reporting and not recording the previous false detections caused by the arthropods. The system 100 can reduce future false detections because the arthropods have been successfully deterred from the camera 104 by the high-frequency ultrasound waves 105 generated from the ultrasound emitter 128.

Figure 2:
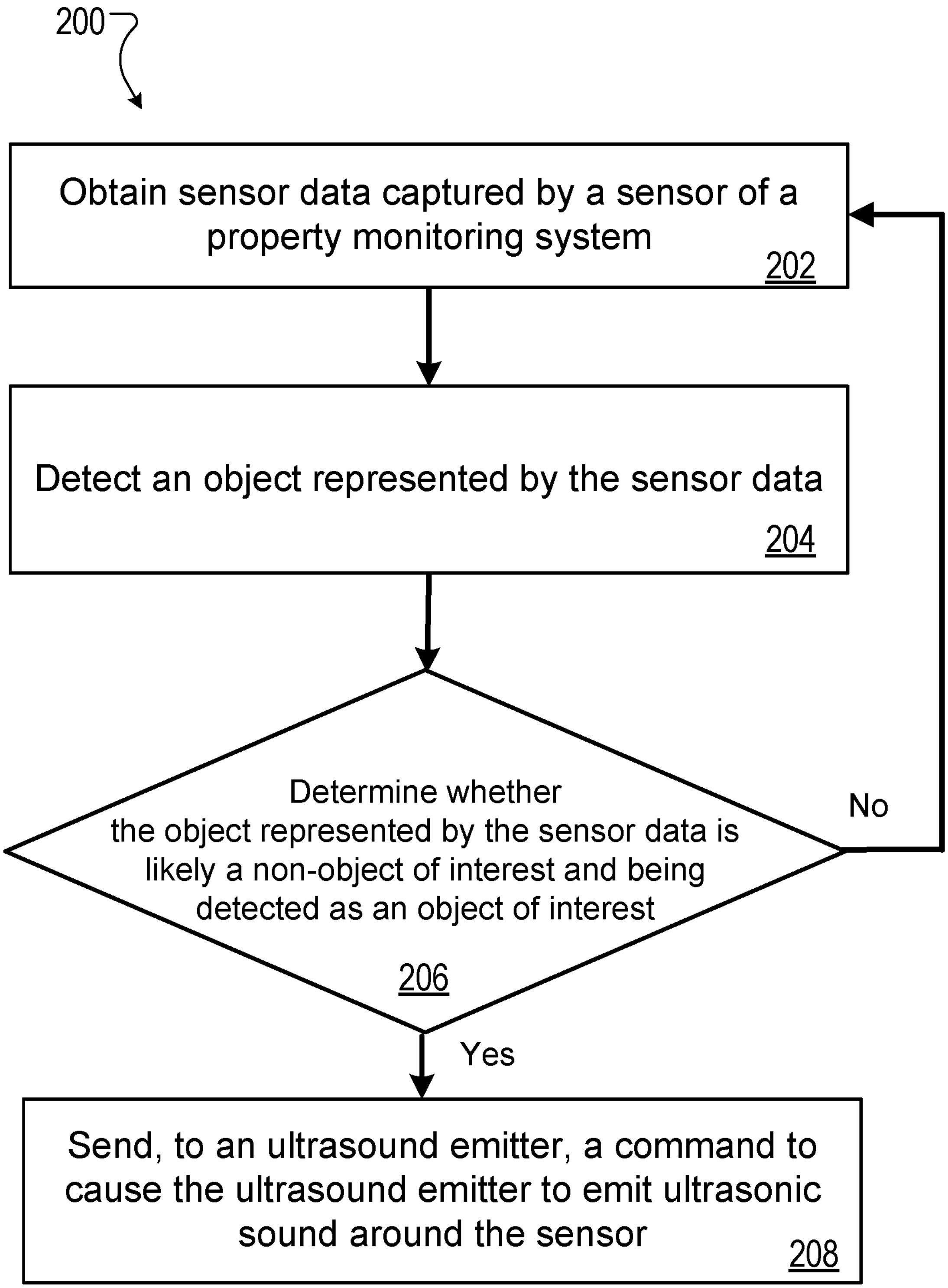
FIG. 2 is a flow chart illustrating an example of a process for reducing false detections using an ultrasound emitter.

FIG. 2 is a flow chart illustrating an example of a process 200 for reducing false detections using an ultrasound emitter. The process 200 can be performed by one or more computer systems, for example, the property monitoring system 100, the object detection engine 120, the deterrence engine 124, or a combination of these. In some implementations, some or all of the process 200 can be performed by a property monitoring system 100 located at the property 102, or by another computer system 130 located at another location.

The system obtains sensor data captured by a sensor of a property monitoring system (202). For example, the object detection engine 120 may obtain, from the security camera 104, continuously captured images of a scene near a property 102 that is being monitored. Although the process is illustrated using images captured by the camera of the property monitoring system, the systems and techniques discussed here can be applied to one or more videos captured by the camera, or any types of sensor data captured by any types of sensor of the property monitoring system.

The system detects an object represented by the sensor data (204). For example, the object detection engine 120 can employ one or more image analysis and computer vision methods to perform analysis of one or more images 118 captured by the camera 104. The deterrence engine 124 can determine whether an image 118 captures an object, such as a stranger entering the driveway of the house. In response to detecting the objects in the images captured by the camera, the property monitoring system 100 can save the one or more images that depict the object in a data storage system. In some implementations, the system 100 can send a notification to an owner of the property, and the notification can include the image that depicts the detected object.

The system determines whether the object represented by the sensor data is likely a non-object of interest and being detected as an object of interest (206). In some implementations, the non-object of interest can include an arthropod, a web of the arthropod, or both. A bug being in front of the camera is undesirable when the bug stays in front of the camera and triggers multiple or persistent object detections in a short period of time. For example, the deterrence engine 124 can determine that a detected object represented by an image is likely a non-objects of interest, e.g., a moth, and being detected as an object of interest, e.g., a human.

In some implementations, the system can detect, within a period of time, at least a plurality of objects including the object represented by the sensor data. The system can determine that a frequency of the plurality of objects satisfies a predetermined threshold. The frequency of the plurality of objects can include the number of object detections within a period of time, a frequency value, or a gap between the object detections. In response to determining that the frequency of the plurality of objects satisfies the predetermined threshold, the system can determine, for each of the plurality of objects, whether the corresponding object is likely a non-object of interest and being detected as an object of interest, including determining whether the object represented by the sensor data is likely a non-object of interest and being detected as an object of interest. In some implementations, the plurality of objects can be the same non-object of interest, e.g., due to a moth 108 that has been hovering around the camera 104. In some implementations, the plurality of objects can be different non-objects of interest, e.g., due to multiple insects that have been flying around the camera.

For example, the system could be configured to activate the ultrasound emitter 128 only when the frequency of detected objects over a period of time exceeds a predetermined threshold. The system can determine that an insect being in front of the camera is only problematic if the insect stay or hover in front of the camera and triggers multiple or persistent object detections, the corresponding video recordings, the corresponding user notifications, of a combination of them, e.g., if an object is detected more than a threshold amount of times within a predetermined period of time. For example, the deterrence engine 124 can determine that a detected object is likely a non-object of interest near the camera 104 and being detected as an object of interest because the object detection engine 120 detected a human ten times, which is more than the predetermined threshold of five times, in the past two minutes.

In response to determining that the object represented by the sensor data is likely the non-object of interest and being detected as the object of interest, the system sends, to an ultrasound emitter, a command to cause the ultrasound emitter to emit ultrasonic sound around the sensor (208). Because the ultrasonic sound can deter or repel arthropods, the non-objects of interest, e.g., the bug, may move away from the area near the camera. Therefore, for example, the object detection engine 120 may no longer generate false detections due to the movement of the non-objects of interest.

Because the effectiveness of the ultrasound emitter can become diminished if the ultrasound emitter is constantly on, the system 100, for example, can be configured to send a command to cause the ultrasound emitter to intermittently emit the ultrasonic sound around the sensor. For example, the system can intermittently turn on the ultrasound emitter. For example, the deterrence engine 124 can be configured to intermittently turn on the ultrasound emitter in response to a trigger event that is determined based on the object detection results.

In some implementations, the system can receive a signal from a user device indicating that the object caused a false detection. A user device of the system 100 can send a signal to the system 100 when the user device receives from the system a detection result that is a false positive detection due to the presence of flying arthropods. For example, the owner of the property can determine that the objects detected in the images included in the notification sent from the system 100 are false positives due to flying bugs. The owner can send, through a user device, to the system 100, a message indicating that the objects detected in the images are false positives. In response, the deterrence engine 124 can turn on the ultrasound emitter and the ultrasound emitter can emit short bursts of high-frequency waves to repel the flying bugs.

If the system determines that the object represented by the sensor data is not likely a non-object of interest and being detected as an object of interest, the system may not send a command to cause the ultrasound emitter to emit ultrasonic sound around the sensor. The system can continue monitoring the property and can determine whether objects represented by future sensor data is likely a non-object of interest and being detected as an object of interest.

In some implementations, the system can determine that the object was not detected in second sensor data captured by the sensor while the ultrasound emitter was emitting the ultrasonic sound. In response to determining that the object was not detected in the second sensor data captured by the sensor while the ultrasound emitter was emitting the ultrasonic sound, the system can determine that the object caused a false detection. For example, after the ultrasound emitter emits the ultrasonic sound for a period of time, the system 100 can determine that the object is no longer detected in the images captured by the camera 104, or fewer objects are detected in the images captured by the camera 104 over a period of time. The system 100 can confirm that the object represented by the previously captured image is indeed a non-object of interest and being detected as an object of interest, and the previously detected object can be caused by arthropods, such as insects, spiders, and so on. The system can determine that the previously detected object caused a false detection.

In response to determining that the previously detected object caused a false detection, the system can determine to skip performing an action using the sensor data which action would be performed if the object represented by the sensor data was likely an object of interest. For example, the system 100 can determine to skip sending the images or video clips corresponding to the detected object stored in the data storage system. In some implementations, the system can delete the images or video clips stored in the data storage system.

In some implementations, the system can classify information generated from the sensor data corresponding to the object with a non-object label. For example, the system 100 can classify the images or video clips corresponding to the non-objects of interest with a specific label, such as "OTHER" or "Potential Insect Capture". In some implementations, the system can determine to skip sending a notification of the false detection to a user device. In some implementations, the system 100 can determine not to send the images or video clips corresponding to the non-objects of interest to a user device of the property monitoring system such that the user of the user device is not disturbed by the false positive detections.

In some implementations, after the ultrasound emitter emits the ultrasonic sound for a period of time, the system 100 can determine that a similar amount of possible false positives are still detected in the images captured by the camera 104. In response, the system 100 can determine that the detected objects from the images captured by the camera are not likely non-objects of interest caused by arthropods. The system 100 can save the images or send the images to the user device of the system for further review.

In some implementations, determining that the object represented by the sensor data is likely the non-object of interest and being detected as the object of interest can include: determining, using a first sensor analysis process, that the object is a potential object of interest; and after determining that the object is the potential object of interest, determining, using a second different sensor analysis process, that the potential object of interest is likely the non-object of interest. For example, the second different sensor analysis process can include using an audio sensor. The system 100 can include an audio sensor equipped with an audio analysis engine. The audio analysis engine can generate an audio analysis result indicating that a recorded audio includes the sound of a bug, or the sound of a particular type of bug. In response, the system 100 can determine that the objects detected in the images captured while the audio is being captured are likely arthropods near the camera. In some implementations, the audio analysis engine can generate an audio analysis result indicating that a recorded audio includes the sound of a person and does not include the sound of a bug. In response, the system can determine that the objects detected in the images captured by the camera while the audio is being captured are likely not non-objects of interest caused by arthropods, and the detected objects can include a person or the motion of a person near the camera.

Figure 3:
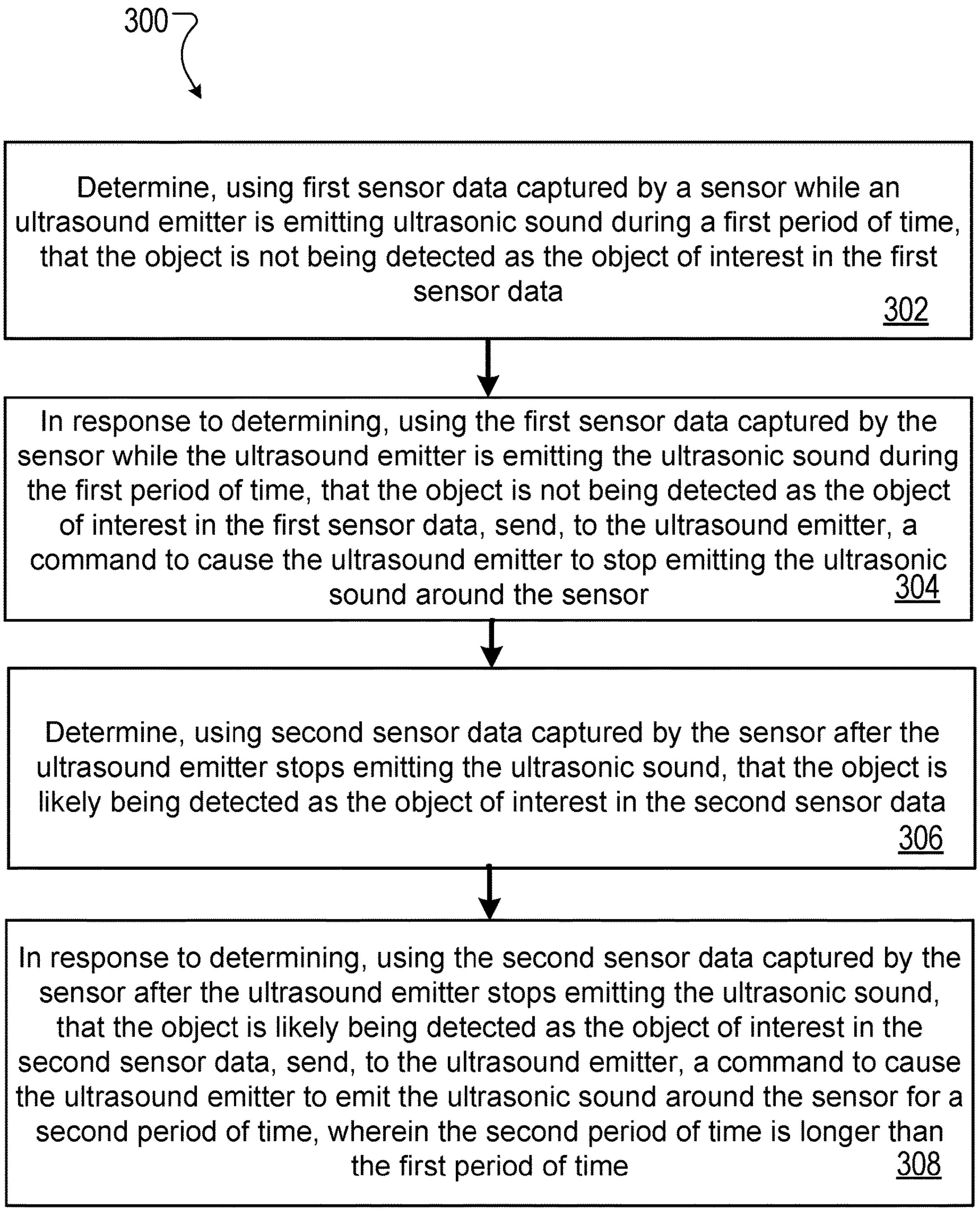
FIG. 3 is a flow chart illustrating an example of a process for reducing false detections by increasing emission time of an ultrasound emitter.

FIG. 3 is a flow chart illustrating an example of a process 300 for reducing false detections by increasing emission time of an ultrasound emitter. The process 300 can be performed by one or more computer systems, for example, the property monitoring system 100, the object detection engine 120, the deterrence engine 124, or a combination of these. In some implementations, some or all of the process 300 can be performed by a property monitoring system 100 located at the property 102, or by another computer system 130 located at another location.

The system determines, using first sensor data captured by a sensor while an ultrasound emitter is emitting ultrasonic sound during a first period of time, that the object is not being detected as an object of interest in the first sensor data (302). For example, while the ultrasound emitter 128 is turned on and emitting the ultrasound waves 105, the moth 108 temporarily flies away from the field of view of the camera 104. Thus, the system can determine that the previously detected object, e.g., due to the moth, is not being detected as an object of interest.

In some implementations, the system, e.g., the deterrence engine 124, can determine that the number of objects detected in a period of time is less than a predetermined threshold. For example, the object detection engine 120 did not detect any human in the past two minutes, or the object detection engine 120 only detected a human in one image captured in the past two minutes. The deterrence engine 124 can determine that the likely non-objects of interest are away from the camera. Thus, the deterrence engine 124 can turn off the ultrasound emitter after the ultrasound emitter is turned on for a first period of time, e.g., five minutes.

In some implementations, determining that the object is not being detected as an object of interest in the first sensor data, e.g., images captured by the camera, while the ultrasound emitter is emitting the ultrasonic sound during the first period of time can include determining that a frequency of a plurality of detected objects satisfies a second predetermined threshold, e.g., the frequency of the plurality of detected objects may have decreased from before the ultrasound emitter was turned on. For example, the deterrence engine 124 may determine that only a fourth as many detections occurred during the same length of time when the ultrasonic emitter was turned on as when the ultrasonic emitter was turned off.

In response to determining, using the first sensor data captured by the sensor while the ultrasound emitter is emitting the ultrasonic sound during the first period of time, that the object is not being detected as the object of interest in the first sensor data, the system sends, to the ultrasound emitter, a command to cause the ultrasound emitter to stop emitting the ultrasonic sound around the sensor (304). The system may determine that the arthropod that causes the detected object in the sensor data has moved away from the camera, and the system can determine to turn off the ultrasound emitter.

The system determines, using second sensor data captured by the sensor after the ultrasound emitter stops emitting the ultrasonic sound, that the object is likely being detected as the object of interest in the second sensor data (306). For example, after the ultrasound emitter is turned off, the bug, e.g., the moth 108 flies back to the area near the camera 104 because the bug is again attracted by the IR light of the camera. The deterrence engine 124 can determine that the object detected in a newly captured image is likely the non-objects of interest and being detected as the object of interest because an object, e.g., a human, is detected more than a threshold number of times in a short period of time, e.g., detecting a human five times in two minutes.

In response to determining, using the second sensor data captured by the sensor after the ultrasound emitter stops emitting the ultrasonic sound, that the object is likely being detected as the object of interest in the second sensor data, the system sends, to the ultrasound emitter, a command to cause the ultrasound emitter to emit the ultrasonic sound around the sensor for a second period of time, wherein the second period of time is longer than the first period of time (308). For example, the deterrence engine 124 can trigger the ultrasound emitter to emit the ultrasound waves for seven minutes, which is longer than the first period of time of five minutes, in order to permanently deter or repel the bug away.

In some implementations, the deterrence engine 124 can deactivate or turn off the emitter based on information of a light source near the property. In some implementations, the system can determine that a light source near the sensor is off, and in response to determining that the light source near the sensor is off, the system can determine to deactivate the ultrasound emitter. For example, the deterrence engine 124 can be configured to deactivate the ultrasound emitter 128 when no light source near the property is on because arthropods are not likely near the camera if there are no lights. In some examples, the deterrence engine 124 can be configured to deactivate the ultrasound emitter when a secondary light source near the camera is on because the secondary light source can likely attract many arthropods and the ultrasound emitter may not effectively repel the arthropods.

The system can include an ambient light sensor that can measure the amount of light in the scene. The system can include an image sensor that can analyze and determine hot spots in images that might indicate a secondary light source. By using the ambient light sensor or the image sensor, the system can detect that a light source near the property is turned on, e.g., a motion triggered lighting near the property 102 is turned on. In response, the system can deactivate the ultrasound emitter while the light source is on.

In some implementations, the system can obtain information of a light source through the operation information of a known device on the property and the system can use the operation information of the known device to control the ultrasound emitter. For example, when "Entry Light" of the property 102 is turned on, the system can obtain the operation information of the entry light and the system can deactivate the ultrasound emitter.

In some implementations, the system can perform analysis of the detected object in the images captured by the camera. The system can determine that an object of interest is detected in the image and that detection information has been used to trigger other devices in the property monitoring system. In response, the system can deactivate the ultrasound emitter. For example, the object detection engine can determine that a person is in the image captured by the camera and the information has been set to be a trigger to turn on the floodlight installed on the property. In response, the system can deactivate the ultrasound emitter until the floodlight is turned off.

Figure 4:
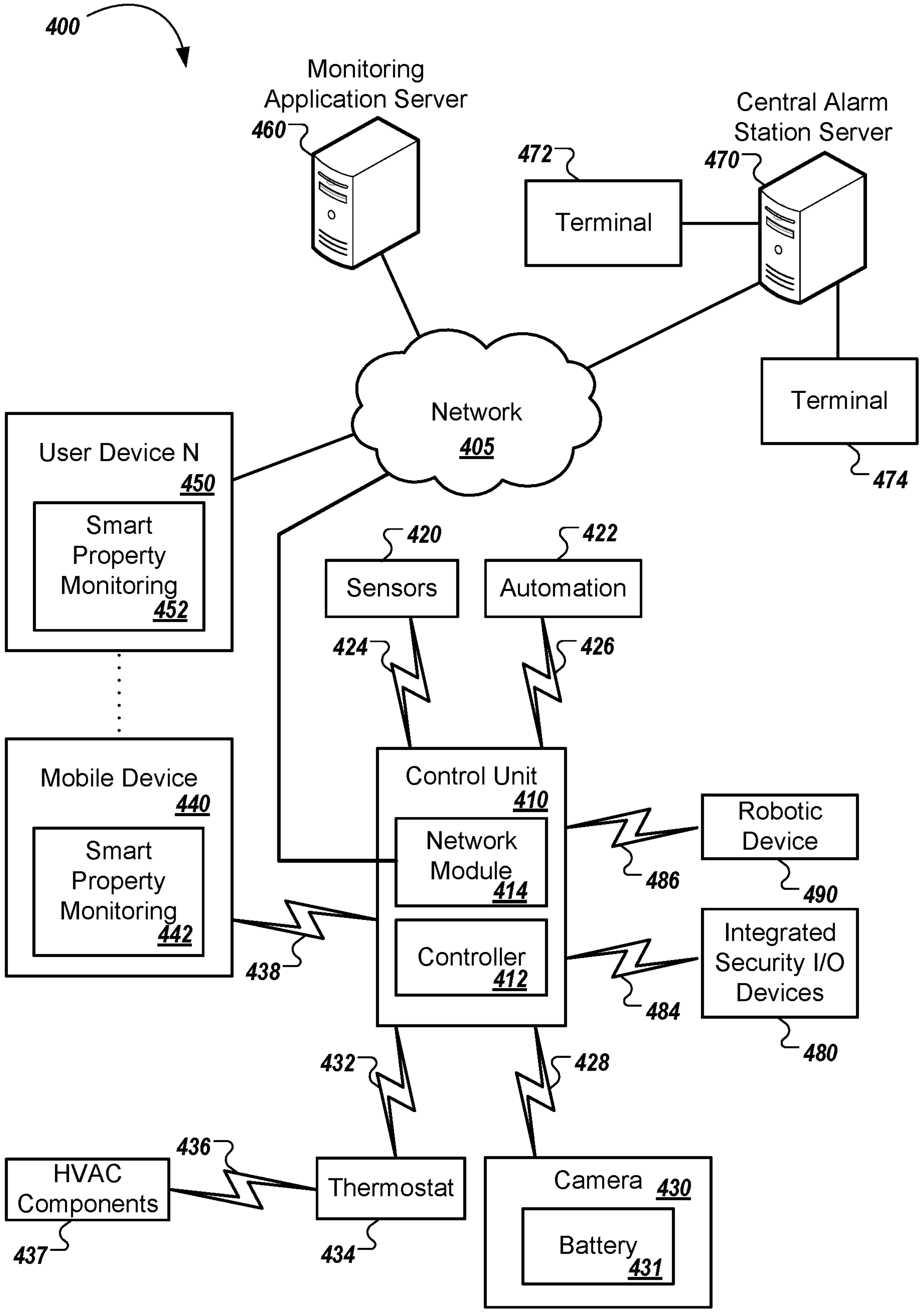
FIG. 4 is a diagram illustrating an example of a property monitoring system.

FIG. 4 is a diagram illustrating an example of a property monitoring system 400. The property monitoring system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 420 can include a radio-frequency identification (RFID) sensor that identifies a particular article that includes a pre-assigned RFID tag.

The control unit 410 communicates with the module 422 and a camera 430 to perform monitoring. The module 422 is connected to one or more devices that enable property automation, e.g., home or business automation. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol). Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430. The camera 430 can include one or more batteries 431 that require charging.

A drone 490 can be used to survey the electronic system 400. In particular, the drone 490 can capture images of each item found in the electronic system 400 and provide images to the control unit 410 for further processing. Alternatively, the drone 490 can process the images to determine an identification of the items found in the electronic system 400.

The camera 430 may be a video/photographic camera or other type of optical sensing device configured to capture images. For instance, the camera 430 may be configured to capture images of an area within a property monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more module 422.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in security monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a property charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the property. The robotic devices 490 may be configured to navigate to the charging stations after completion of tasks needed to be performed for the property monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the property monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the module 422, the camera 430, the thermostat 434, and the integrated security devices 480 may communicate with the controller 412 over communication links 424, 426, 428, 432, 438, 484, and 486. The communication links 424, 426, 428, 432, 438, 484, and 486 may be a wired or wireless data pathway configured to transmit signals from the sensors 420, the module 422, the camera 430, the thermostat 434, the drone 490, and the integrated security devices 480 to the controller 412. The sensors 420, the module 422, the camera 430, the thermostat 434, the drone 490, and the integrated security devices 480 may continuously transmit sensed values to the controller 412, periodically transmit sensed values to the controller 412, or transmit sensed values to the controller 412 in response to a change in a sensed value. In some implementations, the drone 490 can communicate with the monitoring application server 460 over network 405. The drone 490 can connect and communicate with the monitoring application server 460 using a Wi-Fi or a cellular connection.

The communication links 424, 426, 428, 432, 438, 484, and 486 may include a local network. The sensors 420, the module 422, the camera 430, the thermostat 434, the drone 490 and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CATS) or Category 6 (CAT6) wired Ethernet network. The local network may be a mesh network constructed based on the devices connected to the mesh network.

The monitoring application server 460 is an electronic device configured to provide monitoring services by exchanging electronic communications with the control unit 410, the one or more user devices 440 and 450, and the central alarm station server 470 over the network 405. For example, the monitoring application server 460 may be configured to monitor events (e.g., alarm events) generated by the control unit 410. In this example, the monitoring application server 460 may exchange electronic communications with the network module 414 included in the control unit 410 to receive information regarding events (e.g., alerts) detected by the control unit 410. The monitoring application server 460 also may receive information regarding events (e.g., alerts) from the one or more user devices 440 and 450.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system 400 and perform analysis of sensor and image data received from the monitoring system 400. Based on the analysis, the monitoring application server 460 may communicate with and control aspects of the control unit 410 or the one or more user devices 440 and 450.

The monitoring application server 460 may provide various monitoring services to the system 400. For example, the monitoring application server 460 may analyze the sensor, image, and other data to determine an activity pattern of a resident of the property monitored by the system 400. In some implementations, the monitoring application server 460 may analyze the data for alarm conditions or may determine and perform actions at the property by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring application server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440 and 450 are devices that host and display user interfaces. For instance, the user device 440 is a mobile device that hosts or runs one or more native applications (e.g., the smart property application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart property application 442. The smart property application 442 refers to a software/firmware program running on the corresponding mobile device that enables the user interface and features described throughout. The user device 440 may load or install the smart property application 442 based on data received over a network or data received from local media. The smart property application 442 runs on mobile devices platforms, such as iPhone, iPod touch, Blackberry, Google Android, Windows Mobile, etc. The smart property application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart property user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the module 422, the camera 430, and the robotic devices, e.g., that can include the drone 490. The one or more user devices 440 and 450 receive data directly from the sensors 420, the module 422, the camera 430, and the robotic devices and send data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors 420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that the pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:

obtaining sensor data captured by a sensor of a property monitoring system;

detecting an object represented by the sensor data;

determining, using a first sensor analysis process, that the object is a potential object of interest;

in response to determining that the object is the potential object of interest, determining, using an audio sensor connected to an audio analysis engine, that the potential object of interest is not likely to be an object of interest, wherein the audio analysis engine generates an audio analysis result indicating that a recorded audio includes a sound of an arthropod; and in response to determining that the potential object of interest is not likely to be the object of interest, sending, to an ultrasound emitter, a command to cause the ultrasound emitter to emit ultrasonic sound around the sensor.

2. The method of claim 1, comprising:

determining, using first sensor data captured by the sensor while the ultrasound emitter is emitting the ultrasonic sound during a first period of time, that the object is not being detected as the object of interest in the first sensor data;

in response to determining, using the first sensor data captured by the sensor while the ultrasound emitter is emitting the ultrasonic sound during the first period of time, that the object is not being detected as the object of interest in the first sensor data, sending, to the ultrasound emitter, a command to cause the ultrasound emitter to stop emitting the ultrasonic sound around the sensor;

determining, using second sensor data captured by the sensor after the ultrasound emitter stops emitting the ultrasonic sound, that the object is likely being detected as the object of interest in the second sensor data; and in response to determining, using the second sensor data captured by the sensor after the ultrasound emitter stops emitting the ultrasonic sound, that the object is likely being detected as the object of interest in the second sensor data, sending, to the ultrasound emitter, a command to cause the ultrasound emitter to emit the ultrasonic sound around the sensor for a second period of time, wherein the second period of time is longer than the first period of time.

3. The method of claim 1, wherein the object represented by the sensor data comprises an arthropod, a web of the arthropod, or both.

4. The method of claim 1, comprising:

detecting, within a period of time, at least a plurality of objects including the object;

determining that a frequency of the plurality of objects satisfies a predetermined threshold; and in response to determining that the frequency of the plurality of objects satisfies the predetermined threshold, determining, for each of the plurality of objects, whether the corresponding object is not likely to be an object of interest and being detected as an object of interest, including determining whether the object represented by the sensor data is not likely to be an object of interest and being detected as an object of interest.

5. The method of claim 1, wherein determining that the object represented by the sensor data is not likely to be the object of interest and being detected as the object of interest comprises:

receiving a signal from a user device indicating that the object caused a false detection.

6. The method of claim 1, comprising:

determining that the object was not detected in second sensor data captured by the sensor while the ultrasound emitter was emitting the ultrasonic sound; and in response to determining that the object was not detected in the second sensor data captured by the sensor while the ultrasound emitter was emitting the ultrasonic sound, determining that the object caused a false detection.

7. The method of claim 6, comprising:

determining to skip performing an action using the sensor data which action would be performed if the object represented by the sensor data was likely an object of interest.

8. The method of claim 6, comprising:

classifying information generated from the sensor data corresponding to the object with a non-object label.

9. The method of claim 6, comprising:

determining to skip sending a notification of the false detection to a user device.

10. The method of claim 1, comprising:

determining that a light source near the sensor is off; and in response to determining that the light source near the sensor is off, determining to deactivate the ultrasound emitter.

11. The method of claim 1, wherein the audio analysis result indicates that the recorded audio includes a sound of a particular type of arthropod.

12. A system comprising one or more computers and one or more storage devices on which are stored instructions that are operable, when executed by the one or more computers, to cause the one or more computers to perform operations comprising:

obtaining sensor data captured by a sensor of a property monitoring system;

detecting an object represented by the sensor data;

determining, using a first sensor analysis process, that the object is a potential object of interest;

in response to determining that the object is the potential object of interest, determining, using an audio sensor connected to an audio analysis engine, that the potential object of interest is not likely to be an object of interest, wherein the audio analysis engine generates an audio analysis result indicating that a recorded audio includes a sound of an arthropod; and in response to determining that the potential object of interest is not likely to be the object of interest, sending, to an ultrasound emitter, a command to cause the ultrasound emitter to emit ultrasonic sound around the sensor.

13. The system of claim 12, wherein the operations comprise:

determining, using first sensor data captured by the sensor while the ultrasound emitter is emitting the ultrasonic sound during a first period of time, that the object is not being detected as the object of interest in the first sensor data;

in response to determining, using the first sensor data captured by the sensor while the ultrasound emitter is emitting the ultrasonic sound during the first period of time, that the object is not being detected as the object of interest in the first sensor data, sending, to the ultrasound emitter, a command to cause the ultrasound emitter to stop emitting the ultrasonic sound around the sensor;

determining, using second sensor data captured by the sensor after the ultrasound emitter stops emitting the ultrasonic sound, that the object is likely being detected as the object of interest in the second sensor data; and in response to determining, using the second sensor data captured by the sensor after the ultrasound emitter stops emitting the ultrasonic sound, that the object is likely being detected as the object of interest in the second sensor data, sending, to the ultrasound emitter, a command to cause the ultrasound emitter to emit the ultrasonic sound around the sensor for a second period of time, wherein the second period of time is longer than the first period of time.

14. The system of claim 12, wherein the object represented by the sensor data comprises an arthropod, a web of the arthropod, or both.

15. The system of claim 12, wherein the operations comprise:

detecting, within a period of time, at least a plurality of objects including the object;

determining that a frequency of the plurality of objects satisfies a predetermined threshold; and in response to determining that the frequency of the plurality of objects satisfies the predetermined threshold, determining, for each of the plurality of objects, whether the corresponding object is not likely to be an object of interest and being detected as an object of interest, including determining whether the object represented by the sensor data is not likely to be an object of interest and being detected as an object of interest.

16. The system of claim 12, wherein determining that the object represented by the sensor data is not likely to be the object of interest and being detected as the object of interest comprises:

receiving a signal from a user device indicating that the object caused a false detection.

17. The system of claim 12, wherein the operations comprise:

determining that the object was not detected in second sensor data captured by the sensor while the ultrasound emitter was emitting the ultrasonic sound; and in response to determining that the object was not detected in the second sensor data captured by the sensor while the ultrasound emitter was emitting the ultrasonic sound, determining that the object caused a false detection.

18. The system of claim 17, wherein the operations comprise:

determining to skip performing an action using the sensor data which action would be performed if the object represented by the sensor data was likely an object of interest.

19. The system of claim 17, wherein the operations comprise:

classifying information generated from the sensor data corresponding to the object with a non-object label.

20. A non-transitory computer storage medium encoded with instructions that, when executed by one or more computers, cause the one or more computers to perform operations comprising:

obtaining sensor data captured by a sensor of a property monitoring system;

detecting an object represented by the sensor data;

determining, using a first sensor analysis process, that the object is a potential object of interest;

in response to determining that the object is the potential object of interest, determining, using an audio sensor connected to an audio analysis engine, that the potential object of interest is not likely to be an object of interest, wherein the audio analysis engine generates an audio analysis result indicating that a recorded audio includes a sound of an arthropod; and in response to determining that the potential object of interest is not likely to be the object of interest, sending, to an ultrasound emitter, a command to cause the ultrasound emitter to emit ultrasonic sound around the sensor.

* * * * *